April 19, 1927.  J. M. COOPER  1,625,192

CANDY BOX

Filed Dec. 7, 1925

Inventor
Joseph M. Cooper.
By A. J. O'Brian
Attorney

Patented Apr. 19, 1927.

1,625,192

UNITED STATES PATENT OFFICE.

JOSEPH M. COOPER, OF DENVER, COLORADO.

CANDY BOX.

Application filed December 7, 1925. Serial No. 73,667.

This invention relates to improvements in candy boxes.

In stores dealing in candy it is customary to arrange the candy neatly on trays so as to make an inviting showing when displayed. Since the candy is usually received from the factory in pasteboard boxes, the several pieces of candy must be separately removed and piled upon the trays. This involves considerable labor and is also objectionable on account of the handling. To overcome this objection, it has been proposed to make the boxes in three parts comprising a tray which forms the base, a central portion forming the sides, and a cover. The candy is packed into these boxes in layers separated by paper. When the top and side members are removed, the candy will be supported on the base and retain the shape it had in the box It is the object of this invention to produce a candy box which shall be so constructed that the candy may be placed on superimposed trays that are held in vertical alignment by means of angles that project upwardly from the corners of the lowermost tray. Cooperating with these trays is a box and cover. The box has its two sides and ends formed from rectangular portions integral with the bottom; these parts are bent upwardly at right angles to the bottom and are held in that position by means of a paper tape that extends a short distance upwardly and which can be easily torn so as to permit the box to be flattened out so that the superimposed candy trays may be pushed out of the box without disturbing the arrangement of the trays or their contents.

In order more clearly to describe my invention and the manner of using the same, I shall have reference to the accompanying drawing in which it has been illustrated and in which.

Figure 1:
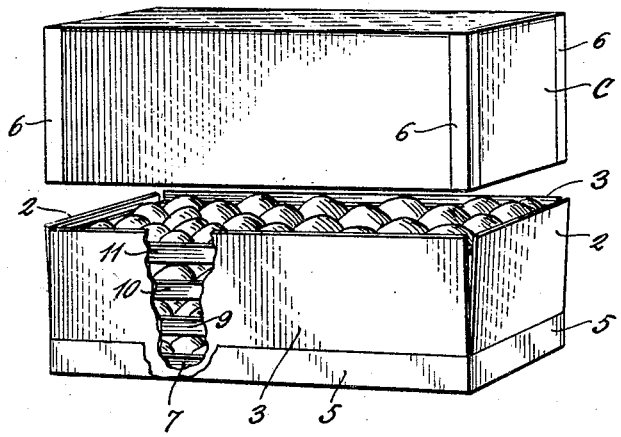
Fig. 1 is a perspective view of my box showing the cover removed and a portion of one side broken away to better disclose the contents.

My invention consists of a combination comprising a box having a bottom member 1, ends 2 and sides 3. The bottom 1 is rectangular The ends 2 and sides 3 are formed integral with the bottom member and are bent upwardly so that the edges of the parts 2 and 3 come into contact thereby forming a box. A paper tape 5 is passed about the box near its bottom and serves to hold the ends and sides in vertical position. The ends and sides are not connected above the upper edge of the tape 5 and may spread slightly in the manner indicated in Fig. 1. It is evident that by applying a little force to the ends or sides, the tape 5 can be torn and the box spread out flat. The cover which has been indicated by letter C in Fig. 1 is made in the same way as the box portion, but the edges of the ends and sides are connected by tapes 6 along the entire depth of the cover as there is no need of tearing the cover apart in the manner contemplated with the box portion. The relative sizes of the box and cover are such that the cover can be readily applied and removed in the usual way. The candy is packed into this box in the following manner. A shallow tray 7 is put into the box and rests upon the bottom. This tray has an angle 8 glued to each corner, the function of which is to keep the trays aligned. After the lower tray has been filled with candy, a second tray (9) is put in place and rests upon the candy; when this is filled a third tray (10) is put in place and then a fourth (11) and so on until the box has been completely filled. In the example shown the box contains four trays.

Figure 2:
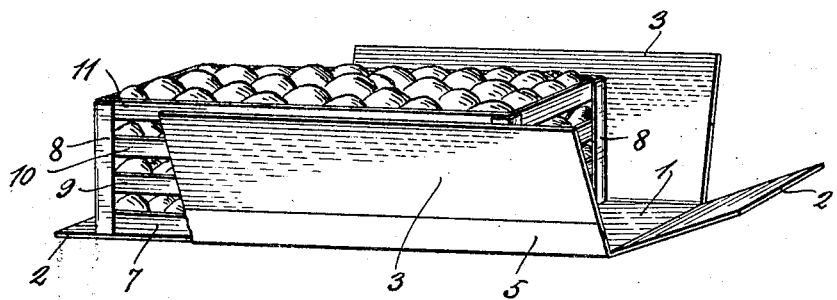
Fig. 2 shows the box torn apart for the purpose of permitting the contents to be removed; the trays and candy being shown partly removed.
Figure 3:
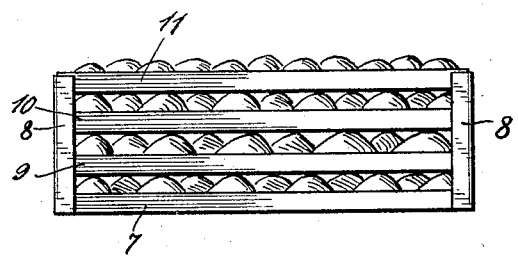
Fig. 3 is a side elevation showing the trays entirely removed.
Figure 4:
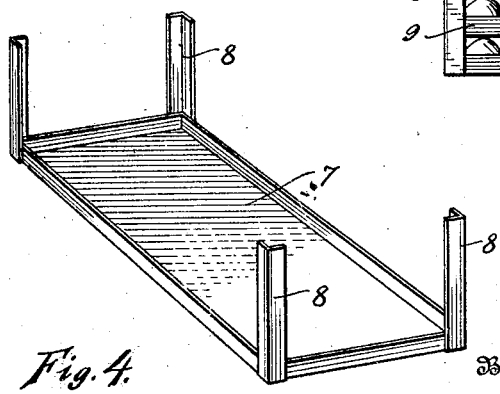
Fig. 4 is a perspective view of the bottom tray showing the upwardly extending angles at the corners.

When the candy is to be unpacked the merchant removes the cover and grasps the ends 2 exerting sufficient force to tear the tape 5, thereby permitting the ends and sides to be flattened out in the manner shown in Fig. 2. With one hand held against the lower tray 7 and the other grasping one end member 2, the box can be quickly and easily removed, thereby leaving the loaded trays fully exposed as shown in Fig. 3. The loaded trays present a pleasing appearance in the show case and hold the candy securely so that it will not tumble down as sometimes happens when they are piled on trays.

The vertical angles 8 serve to keep the trays from sliding while the box portion is removed and therefore cooperate with the specific box construction to permit the latter to be removed without disturbing the alignment of the trays.

Having now described my invention what I claim as new is:

A candy box and display device comprising, in combination, a plurality of rectangular shallow trays of substantially the same size, each of which has a bottom, two ends and two sides members, said trays being each adapted to receive a layer of candy, the respective superposed trays being of less depth than the pieces of candy they are adapted to receive, the lowermost tray having a guide angular in cross section, secured thereto at each corner, said guides engaging the corresponding corners of each of the superposed trays so as to prevent relative transverse movement.

In testimony whereof I affix my signature.

JOSEPH M. COOPER.